US007558667B2

(12) United States Patent
Kida

(10) Patent No.: US 7,558,667 B2
(45) Date of Patent: Jul. 7, 2009

(54) METHOD FOR DETECTING ASSEMBLED STATE OF GAS SENSORS AND APPARATUS FOR DETECTING ASSEMBLED STATE OF GAS SENSORS

(75) Inventor: Yoshiaki Kida, Kariya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/896,742

(22) Filed: Sep. 5, 2007

(65) Prior Publication Data

US 2008/0059041 A1 Mar. 6, 2008

(30) Foreign Application Priority Data

Sep. 5, 2006 (JP) ............................ 2006-240134

(51) Int. Cl.
*G06F 19/00* (2006.01)
*F02M 69/48* (2006.01)

(52) U.S. Cl. ......................... 701/114; 60/285; 123/486; 123/198 F

(58) Field of Classification Search ................. 701/114, 701/102, 115, 103–105; 123/198 F, 480, 123/486; 60/274, 276, 285
See application file for complete search history.

(56) References Cited

U.S. PATENT DOCUMENTS

| | | | | |
|---|---|---|---|---|
| 4,313,412 A * | 2/1982 | Hosaka et al. | .............. | 123/480 |
| 5,925,088 A | 7/1999 | Nasu | | |
| 6,092,413 A * | 7/2000 | Busch et al. | ............. | 73/114.73 |

FOREIGN PATENT DOCUMENTS

| | | | | |
|---|---|---|---|---|
| DE | 10331333 | A1 | | 3/2005 |
| DE | 10339325 | A1 | | 3/2005 |
| EP | 0860597 | A | | 8/1998 |
| FR | 2858019 | A1 | | 1/2005 |
| FR | 2859241 | A1 | | 3/2005 |
| JP | 08-201334 | | | 8/1996 |
| JP | 2001-116661 | | | 4/2001 |
| JP | 2003-011746 | | | 1/2003 |
| JP | 2003-315210 | | | 11/2003 |
| JP | 2005-133639 | A | * | 5/2005 |
| JP | 2007-32537 | A | * | 2/2007 |

OTHER PUBLICATIONS

Extended European Search Report dated Oct. 29, 2007 in EP 07115615.2.
Examination Report dated Nov. 21, 2007 in EP 07115615.2.

* cited by examiner

*Primary Examiner*—Hieu T Vo
(74) *Attorney, Agent, or Firm*—Nixon + Vanderhye PC

(57) ABSTRACT

A vehicle including plural gas sensors assembled in plural exhaust systems, detecting an oxygen concentration in an exhaust gas, where an air-fuel ratio feedback control is carried out together with an engine control unit. Each gas sensor detects signal of oxygen concentration corresponding to a group of cylinders. The method for detecting an assembled state of the gas sensor: controls an engine control parameter affecting the air-fuel ratio of the engine, so that the values thereof are different from each other for the plural groups of cylinders corresponding to the plural exhaust systems; monitors an output from the gas sensor under the controlled state, the gas sensor being installed in each of the plural exhaust systems; and judges that the gas sensor is in a wrong assembled state if the output from the gas sensor is an abnormal output corresponding to the value of the engine control parameter.

18 Claims, 8 Drawing Sheets

METHOD FOR DETECTING ASSEMBLED STATE OF GAS SENSORS AND APPARATUS FOR DETECTING ASSEMBLED STATE OF GAS SENSORS

CROSS-REFERENCE TO RELATED APPLICATION

This application is related to Japanese Patent Application NO. 2006-240134 filed on Sep. 5, 2006, the contents of which are hereby incorporated by reference.

BACKGROUND OF THE INVENTION

1. Field of the Invention

The present invention relates to a method for detecting an assembled state of gas sensors, particularly, a wrong assembly of the same and relates to an apparatus for detecting a wrong assembly of gas sensors. More particularly, the present invention relates to a method for detecting an assembled state of gas sensors and an apparatus for detecting an assembled state of gas sensors which are disposed in individual exhaust systems of an engine including a plurality of exhaust systems and which detect an oxygen concentration in individual exhaust systems.

2. Description of the Related Art

Conventionally, in an engine of an automobile or the like, gas sensors such as oxygen sensors, air-fuel ratio sensors and the like are disposed in the exhaust system to carry out an optimum feedback control of the air-fuel ratio. While the engine is being operated, an air-fuel ratio control is carried out in the automobile based on signals detected by the gas sensors.

In an engine, such as a V engine or a horizontally-opposed engine, which includes two, that is, left and right banks, an exhaust system is provided for each bank, and a gas sensor is disposed for each exhaust system. Even in inline engines, cylinders are sometimes grouped into front and rear banks, an exhaust system is provided for each bank, and a gas sensor is disposed for each exhaust system. In such a configuration in which gas sensors are disposed so as to correspond to respective banks as described above, the gas sensors assembled at predetermined locations are electrically connected to the engine control apparatus via the wiring harnesses. At this time, to prevent an error in connection (i.e., wrong assembly) from the left and right gas sensors to the engine control apparatus, some conventional configurations have been used which physically disable a connection between left and right opposite banks. The configuration may be one having different connector shapes for left and right or one with a harness having different lengths for the left and right. In some cases, instead of a configuration which disconnects the gas sensors left and right opposite, a wrong assembly is detected by detecting abnormality in a responsiveness diagnosis (self-diagnosis) of gas sensors or fuel feedback correction amount diagnosis when left and right gas sensors are wrongly assembled, that is, left and right opposite.

In addition, a detection apparatus is proposed for a case in which a vehicle is mounted with a master unit and at least one slave unit which are electronics components communicative with each other. For example, in the case of where the slave unit is removed from the vehicle for repairing the vehicle at a maintenance shop and is attached again to the vehicle, the detection apparatus detects that a wrong part is attached in place of the slave unit which was removed. (For example, see Japanese Patent Laid-open Publication No. 2003-11746.) In the apparatus, a Micro Processing Unit (MPU) of the slave unit and an MPU of the master unit calculate respective power supply time periods starting from when the ignition switch is turned ON to when it is turned OFF. In the case where there is a significant change between the power supply time periods for both, a warning apparatus issues a warning indicating that either the master unit or the slave unit is wrongly assembled.

However, having different connector shapes or different wiring harness lengths for the left and right gas sensors causes an increase in the number of parts, leading to an increased cost. In addition, the method for detecting a wrong assembly of gas sensors by detecting abnormality with the gas sensor responsiveness diagnosis or fuel feedback correction amount diagnosis does not enable identification of whether the abnormality is caused by a wrong assembly of the gas sensors left and right opposite or by a problem in the sensor or the engine. This requires investigation of the cause though troubleshooting, requiring a lot of man-hours.

In addition, the method shown in Patent Document 1 cannot be applied to detection of a wrong assembly of gas sensors.

SUMMARY OF THE INVENTION

The present invention has been achieved in light of the foregoing issues. An object of the present invention is to provide a method for detecting an assembled state of gas sensors and an apparatus for detecting an assembled state of gas sensors which are capable of correctly detecting an assembled state of gas sensors without any hardware change.

More specifically, the present invention provides a method or an apparatus for detecting a wrong assembly of a gas sensor.

The present invention is a method for detecting an assembled state of gas sensors in a vehicle to solve the drawbacks as described above. The vehicle is equipped with an engine including a plurality of exhaust systems, a plurality of groups of cylinders which are installed so as to correspond to the plurality of exhaust systems, and a gas sensor which is assembled in each of the plurality of exhaust systems and which detects an oxygen concentration in an exhaust gas for an air-fuel ratio feedback control of the engine based on a signal detected by the gas sensor. The method for detecting an assembled state of gas sensors in the vehicle includes the steps of: controlling a value of an engine control parameter which affects the air-fuel ratio of the engine, so that the values are different from each other for the plurality of groups of cylinders which correspond to the plurality of exhaust systems; monitoring an output from the gas sensor under the controlled state, the gas sensor being installed in each of the plurality of exhaust systems; and determining that the gas sensor is in a wrong assembled state when the output from the gas sensor is not a normal output which corresponds to the value of the engine control parameter.

According to the present invention, when an output from the gas sensor is monitored in a state where the engine control parameter is controlled so that the values of air-fuel ratios are different for individual groups of cylinders which correspond to the individual exhaust systems, and if the gas sensor is wrongly assembled, a right output signal which corresponds to the air-fuel ratio is not outputted. Therefore, a wrong assembly is detected. In other words, the method enables detecting a wrong assembly of a gas sensor without a need to change hardware.

In addition, the present invention is an apparatus for detecting an assembled state of gas sensors in a vehicle. The vehicle is equipped with an engine including a plurality of exhaust systems, a plurality of groups of cylinders which are installed so as to correspond to the plurality of exhaust systems, and a gas sensor which is assembled in each of the plurality of exhaust systems and which detects an oxygen concentration in an exhaust gas. An air-fuel ratio feedback control of the engine based on a signal detected by the gas sensor can then be carried out in the vehicle. The apparatus for detecting an assembled state of said gas sensor includes: engine control parameter control means which controls a value of an engine control parameter which affects the air-fuel ratio of the engine, so that the values are different from each other for the plurality of groups of cylinders which correspond to the plurality of exhaust systems; judgment means which inputs an output from the gas sensor which is installed in each of the plurality of exhaust systems and judges whether the output from the gas sensor is a normal output which corresponds to the value of the engine control parameter; and notification means which gives notice of a result of judgment by the judgment means.

According to the present invention, when a wrong assembly of a gas sensor is to be detected, the engine control parameters are controlled so that the values thereof are different for groups of cylinders which correspond to different exhaust systems. Further, it is judged by the judgment means whether an output signal from the gas sensor which is disposed in each exhaust system is a right output signal which corresponds to the air-fuel ratio. The result of judgment by the judgment means is given notice by the notification means. Accordingly, the present invention enables detecting a wrong assembly of a gas sensor without a need to change hardware.

DETAILED DESCRIPTION OF THE PREFERRED EMBODIMENTS

Hereinafter, embodiments of a method for detecting an assembled state of gas sensors and an apparatus for detecting an assembled state of gas sensors according to the present invention will be described with reference to the diagrams.

First Embodiment

First, a first embodiment in which the present invention is embodied to a V6 engine will be described with reference to FIG. 1 to FIG. 4.

Figure 1:
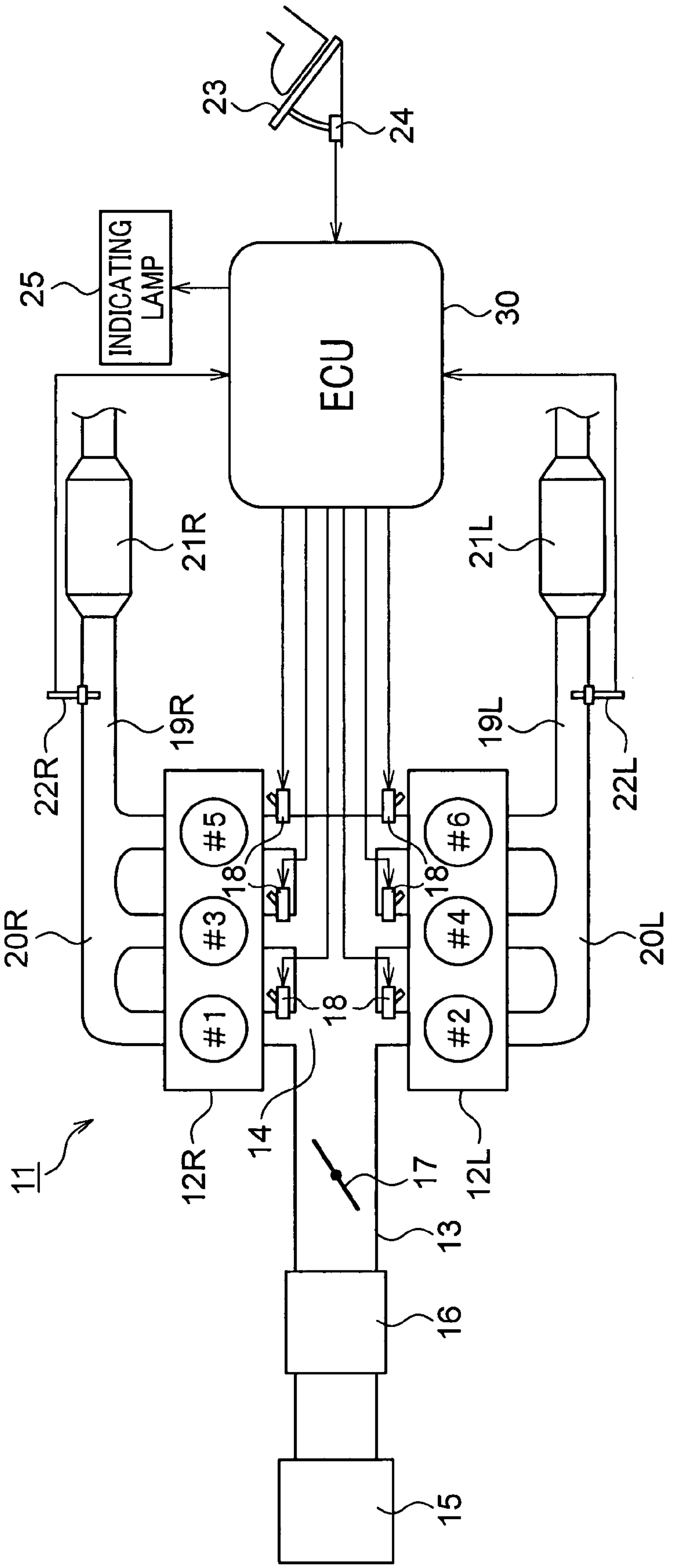
FIG. 1 is a schematic drawing of an engine and peripheral parts thereof in which a method for detecting an assembled state of gas sensors and an apparatus for detecting an assembled state of gas sensors according to a first embodiment of the present invention are employed.

As shown in FIG. 1, a right bank (first bank) 12R of a V6 engine 11 includes three cylinders (cylinders in the first group of cylinders) #1, #3, #5, and a left bank (second bank) 12L thereof includes three cylinders (cylinders in the second group of cylinders) #2, #4, #6, respectively. The engine 11 is connected via an intake manifold (suction manifold) 14 to an intake passage 13 for supplying intake air into the cylinders. An air cleaner 15 is provided at an inlet (start end) of the intake passage 13, and an air flow meter 16 and a throttle valve 17 are provided in the middle of the intake passage 13. A fuel injection valve 18 for each of the cylinders #1 to #6 is disposed in the right and left banks 12R, 12L. After intake air and fuel injected from the fuel injection valve 18 is mixed with each other, the mixture is supplied to each of the cylinders #1 to #6.

The engine 11 includes exhaust passages 19R, 19L for emitting exhaust gas generated by combustion in each of the cylinders, and the banks 12R, 12L are connected to the exhaust passages 19R, 19L, respectively, via the exhaust manifold 20R, 20L, respectively. Further, exhaust gas emitted from each of the cylinders #1, #3, #5 in the right bank 12R is discharged to the atmosphere via the exhaust manifold 20R, the exhaust passage 19R and the like, while exhaust gas emitted from each of the cylinders #2, #4, #6 in the right bank 12L is discharged to the atmosphere via the exhaust manifold 20L, the exhaust passage 19L and the like. A set of the exhaust manifold 20R and the exhaust passage 19R and a set of the exhaust manifold 20L and the exhaust passage 19L constitute separate exhaust systems (first and second exhaust systems), and the exhaust systems are provided so as to correspond to the banks 12R, 12L, respectively.

Emission control devices (catalytic converters) 21R, 21L are provided in the exhaust passages 19R, 19L, respectively, and an oxygen sensor 22R (first oxygen sensor) and an oxygen sensor 22L (second oxygen sensor) both of which serve as gas sensors are provided upstream of the emission control devices 21R, 21L, respectively. That is, the engine 11 includes a plurality of (two in this embodiment) exhaust systems, and the gas sensor for detecting an oxygen concentration in each exhaust gas is disposed in each of the exhaust systems.

The engine 11 is controlled by an electronic control unit (ECU) 30. The ECU 30 is configured mainly by a micro computer which includes a central processing unit (CPU), a memory (ROM) which has stored various types of programs, maps and the like in advance, a random access memory (RAM) for temporarily storing a result of computation by the CPU and the like, a timer counter, an input interface, an output interface and the like. In addition, the ECU 30 carries out various types of controls on the engine 11, for example, on an amount of fuel injected from the fuel injection valves 18, an opening of the throttle valve 17 (that is, an amount of drive an actuator for opening and closing the throttle valve 17) and the like.

Signals detected by various types of sensors for detecting an engine operation state are inputted to the ECU 30. Examples of the above-mentioned sensors include an intake pressure sensor, an intake air temperature sensor, the air flow meter 16, a water temperature sensor for detecting a water temperature of the engine 11, an accelerator opening sensor 24 for detecting an amount of depression of an accelerator pedal 23, a crank angle sensor for detecting a number of revolutions of the engine 11 and an angle of rotation of the crank shaft, a throttle opening sensor for detecting an opening of the throttle valve 17 and the like. For the convenience of illustration, illustration of some of the arrow lines indicating command signals from most sensors and the ECU 30 are omitted in FIG. 1. An indicating lamp 25 is connected to the ECU 30.

The ECU 30 carries out an air-fuel ratio feedback (F/B) control so as to make an air-fuel ratio in the vicinity of theoretical air-fuel ratio based on signals detected from the oxygen sensors 22R, 22L. The ECU 30 includes engine control parameter control means which controls engine control parameters which affect the air-fuel ratio so that the values thereof are different for groups of cylinders which correspond to different exhaust systems, and judgment means which inputs outputs from the oxygen sensors 22R, 22L and which judges whether the outputs from the oxygen sensors 22R, 22L are normal outputs which correspond to the values of the engine control parameters. The indicating lamp 25 functions as notification means for giving notice of the judgment, in the case where the ECU 30 has judged that the outputs from the oxygen sensors 22R, 22L are not normal outputs.

The ECU 30 carries out a control to have cylinders in which a fuel cut operation is carried out during fuel cut to cylinders which belong to one of the banks, as a control to control the engine control parameters so that the values thereof are different for the groups of cylinders which correspond to the different banks 12R, 12L.

Figure 2:
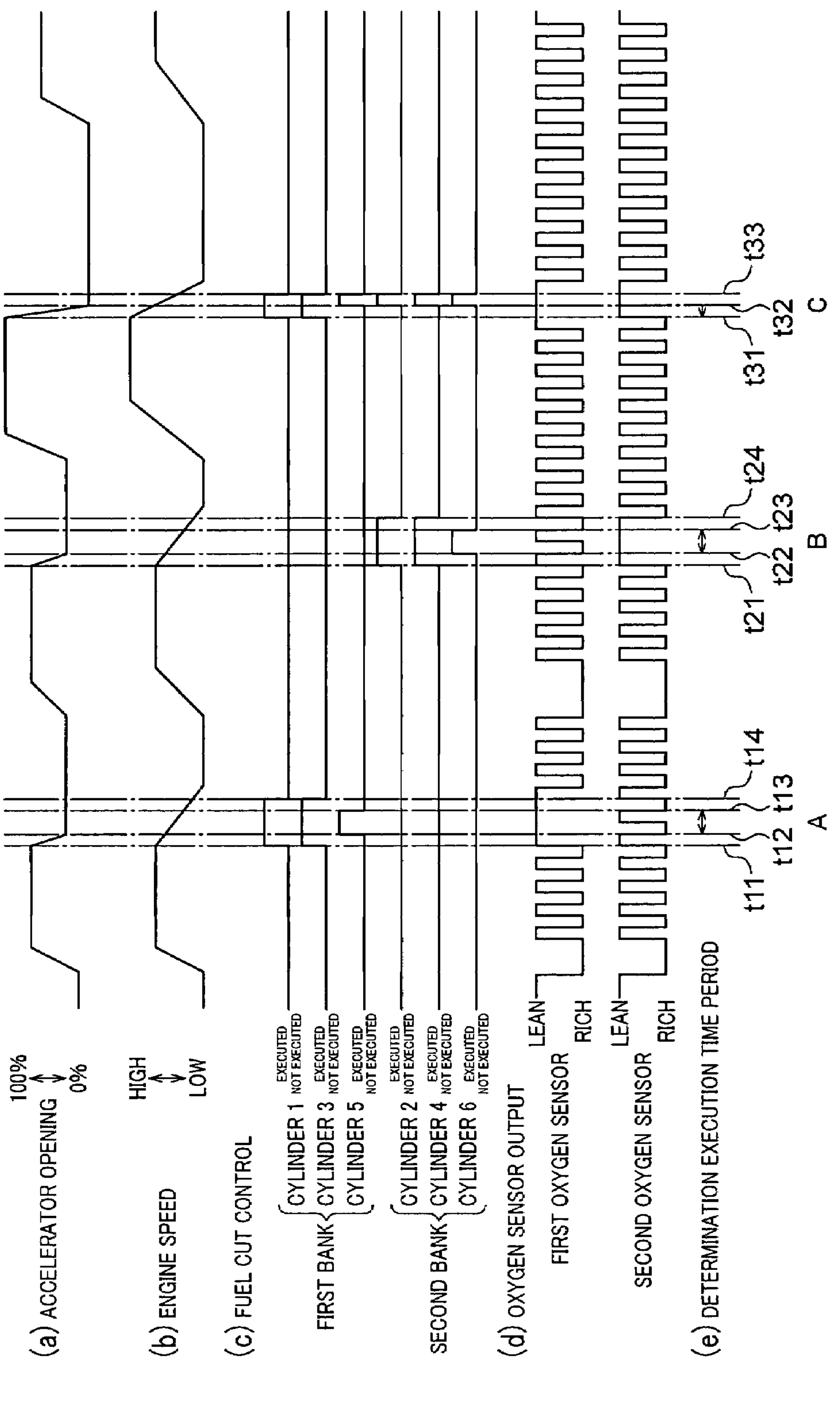
FIG. 2 is a time chart showing an output status of gas sensors (oxygen sensors) and the like in the case where the gas sensors are in a correct assembled state in the first embodiment of the present invention.

FIG. 2 is a time chart showing an accelerator opening, an engine speed, a fuel cut state in each cylinder, and an output status from each oxygen sensor, in the case where a fuel cut control is executed in the state where the oxygen sensors 22R, 22L are correctly assembled. In the present embodiment, a fuel cut operation is carried out when the accelerator opening is decreasing (in a fuel cut state during deceleration).

In the case where fuel cut is concentrated in the cylinders #1, #3, #5 in the first bank (right bank 12R) (i.e., the portion shown by A in FIG. 2), the output from the oxygen sensor 22R (first oxygen sensor) for the right bank 12R definitely corresponds to a lean state during a time period between times t12 to t13. Accordingly, during the time period between times t12 to t13, it is judged whether each of the oxygen sensors 22R, 22L provides a lean output, and the number of such outputs is integrated. When the numbers of integrations are compared between both sensors, a measurement counter for the oxygen sensor 22R (a counter Cn1 to be described later) shows a larger number of integrations. On the other hand, in the case where fuel cut is concentrated in the cylinders #2, #4, #6 in the second bank (left bank 12L) (i.e., the portion shown by B in FIG. 2), the output from the oxygen sensor 22L (second oxygen sensor) for the left bank 12L definitely corresponds to a lean state during a time period between times t22 to t23. Accordingly, during the time period between times t22 to t23, it is judged whether each of the oxygen sensors 22R, 22L provides a lean output, and the number of such outputs is integrated. When the numbers of integrations are compared between both sensors, a measurement counter for the oxygen sensor 22L (a counter Cn2 to be described later) shows a larger number of integrations.

In some cases, in place of concentrating fuel cut in the cylinders in one of the banks, fuel cut is executed in the cylinders in the right and left banks 12R, 12L with different timing of fuel cut as in the portion shown by C in FIG. 2. Even in such cases, although there is a time period in which fuel cut is executed only in one of the banks, the time period is short. Accordingly, if it is judged whether each of the oxygen sensors 22R, 22L provides a lean output during the time period between times t31 to t32 shown in FIG. 2, the number of the outputs is integrated, and the numbers of integrations are compared between both sensors, then the comparison result will be less reliable.

Figure 3:
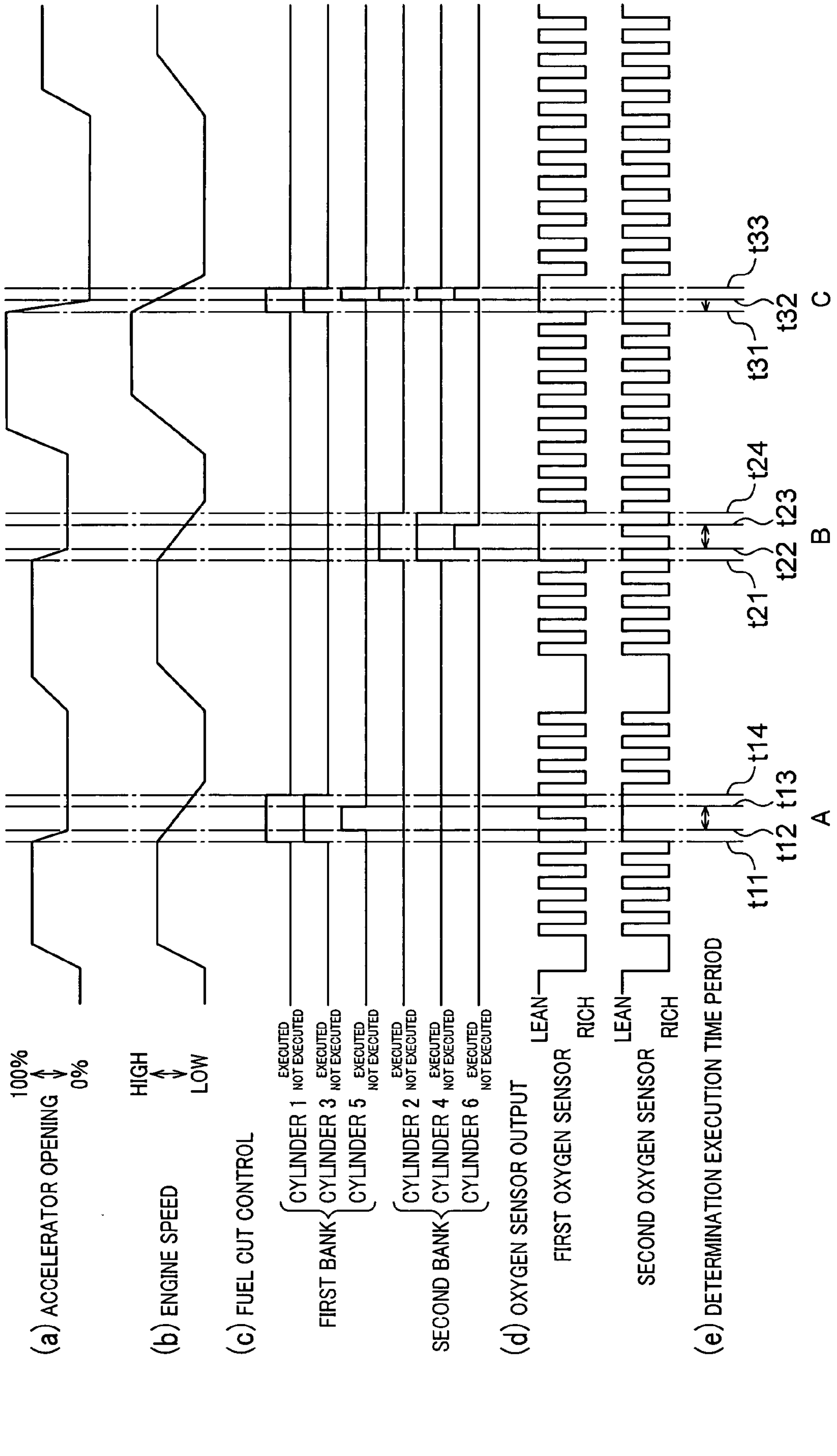
FIG. 3 is a time chart showing an output status of gas sensors (oxygen sensors) and the like in the case where the gas sensors are in a wrong assembled state in the first embodiment of the present invention.

FIG. 3 is a time chart showing an accelerator opening, an engine speed, a fuel cut state in each cylinder, and an output status from each oxygen sensor, in the case where a fuel cut control is executed in the state where the oxygen sensors 22R, 22L are assembled left and right opposite. In this case, in the case where fuel cut is executed concentrated in the cylinders #1, #3, #5 in the first bank (right bank 12R) (i.e., the portion shown by A in FIG. 3), the output from the oxygen sensor 22L for the left bank 12L definitely corresponds to a lean state during a time period between times t12 to t13. On the other hand, in the case where fuel cut is executed concentrated in the cylinders #2, #4, #6 in the second bank (left bank 12L) (i.e., the portion shown by B in FIG. 3), the output from the oxygen sensor 22R for the right bank 12R definitely corresponds to a lean state during a time period between times t22 to t23.

In some cases, in place of concentrating fuel cut in the cylinders in one of the banks, fuel cut is executed in each of the cylinders in the right and left banks 12R, 12L with different timing of fuel cut as in the portion shown by C in FIG. 3. Even in such cases, although there is a time period in which fuel cut is executed only in one of the banks, the time period is short. Accordingly, if it is judged whether each of the oxygen sensors 22R, 22L provides a lean output during the time period between times t31 to t32 shown in FIG. 3, the number of the outputs is integrated, and the numbers of integrations are compared between both sensors, then the comparison result will be less reliable.

It should be noted that, under a normal control state unlike the fuel cut period as described above, the amount of fuel to be supplied is adjusted by controlling fuel injection time in each cylinder or the like based on each oxygen sensor as shown in FIG. 2, such that the fuel injection amount is increased to make the fuel richer if the sensor output is lean, and the fuel injection amount is decreased to make the fuel leaner if the sensor output is rich.

Figure 4:
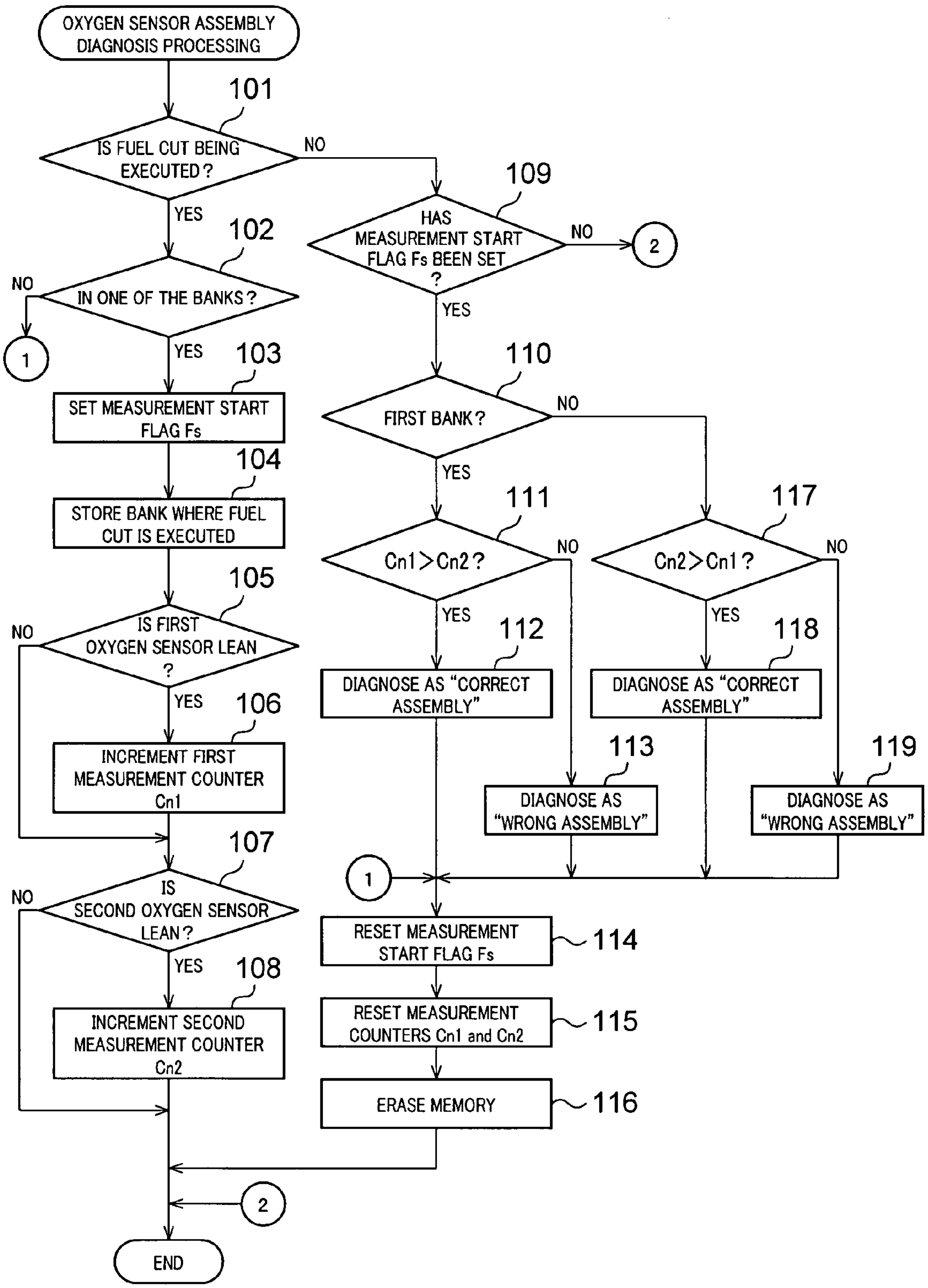
FIG. 4 is a flowchart showing a procedure for detecting a wrong assembled state of gas sensors in the first embodiment of the present invention.

Next, determination of the assembled state of the oxygen sensors, more specifically, a procedure for detecting a wrong assembly will be described with reference to the flowchart shown in FIG. 4. The ECU 30 executes assembly diagnosis processing for oxygen sensors by executing the flowchart shown in FIG. 4 at a predetermined timing. The time period required for executing the processing in the flowchart shown in FIG. 4 once is an extremely short time period compared to a time period during which a fuel cut control is executed, and the processing shown in the flowchart is executed many times while the fuel cut control is executed.

At Step 101, the ECU 30 judges whether a fuel cut control is being executed, if it is being executed, the ECU 30 advances to Step 102 where it judges whether fuel cut is being executed in only one (i.e., one side) of the banks. It should be noted that the ECU 30 determines whether fuel cut is to be executed in both of the banks or it is to be executed only in one of the banks depending on the operation state. The ECU 30 is not provided specially for determining the assembled state, but judges whether fuel cut is executed only in one of the banks under the normal control state of the ECU. In the case where fuel cut is being executed only in one of the banks, after the ECU 30 sets a measurement start flag Fs at Step 103, it stores the bank in which fuel cut is executed at Step 104. Next, the ECU 30 judges at Step 105 whether the output from the first oxygen sensor (oxygen sensor 22R in the right bank 12R) is lean. If the output is lean the ECU 30 advances to Step 106, and if the output is not lean the ECU 30 advances to Step 107. After the ECU 30 increments the first measurement counter Cn1 at Step 10, it advances to Step 107.

At Step 107, the ECU 30 judges whether the output from the second oxygen sensor (oxygen sensor 22L in the left bank 12L) is lean. If the output is lean the ECU 30 advances to Step 108. After the ECU 30 increments the second measurement counter Cn2 at Step 108, it terminates the processing. If the output from the oxygen sensor 22L is not lean at Step 107, the ECU 30 terminates the processing as it is. Since the time period required for executing the processing in the flowchart is extremely short, the same processing is executed several times during which the count value of one of the counters increases.

Meanwhile, if the ECU 30 judges at Step 101 that a fuel cut control is not being executed, the ECU 30 advances to Step 109, and it judges at Step 109 whether the measurement start flag Fs has been set. If the measurement start flag Fs has been set, the ECU 30 advances to Step 110, where it judges whether the bank in which the measurement start flag Fs has been set is the first bank (right bank 12R). If the bank in which the flag has been set is the first bank, the ECU 30 advances to Step 111. At Step 111, the ECU 30 judges whether the count value Cn1 of the first measurement counter Cn1 is greater than the count value Cn2 of the second measurement counter Cn2. If Cn1>Cn2 is established, the ECU 30 diagnoses at Step 112 that the oxygen sensors 22R, 22L are correctly assembled, and if Cn1>Cn2 is not established, the ECU 30 diagnoses at Step 113 that the oxygen sensors 22R, 22L are wrongly assembled. If the ECU 30 makes a diagnosis of wrong assembly, a lighting indication signal is outputted to the indicating lamp 25, whereby the indicating lamp 25 changes to a lighting state.

Next, the ECU 30 advances to Step 114. After the ECU 30 resets the measurement start flag Fs at Step 114, it resets the measurement counters Cn1, Cn2 at Step 115. After the ECU 30 erases the memory of the bank in which fuel cut is executed at Step 116, it terminates the processing.

In the case where the ECU 30 judges at Step 110 that the bank in which the measurement start flag Fs has been set is not the first bank (right bank 12R), the ECU 30 advances to Step 117. The ECU 30 judges at Step 117 whether the count value Cn2 of the second measurement counter Cn2 is greater than the count value Cn1 of the first measurement counter Cn1. If Cn2>Cn1 is established, the ECU 30 diagnoses at Step 118 that the oxygen sensors 22R, 22L are correctly assembled, and if Cn2>Cn1 is not established, the ECU 30 diagnoses at Step 119 that the oxygen sensors 22R, 22L are wrongly assembled. Subsequently, after executing Steps 114, 115, 116, the ECU 30 terminates the processing.

Meanwhile, in the case where the ECU 30 judges at Step 102 that a fuel cut control is not being executed only in one of the banks, in other words, if the ECU 30 judges that a fuel cut operation is being executed in both banks, the ECU 30 advances to Step 114. After executing Steps 114, 115, 116, the ECU 30 terminates the processing.

As described above, a wrong assembly detection apparatus and a wrong assembly detection method of the present embodiment offer excellent advantageous effects as described below.

(1) When the wrong assembly detection apparatus (i.e., apparatus for detecting an assembled state) of gas sensors (oxygen sensors 22R, 22L) detects the assembled state or a wrong assembly, it carries out a control by changing the engine control parameters so that the values of air-fuel ratio are different for groups of cylinders which correspond to different exhaust systems. Next, the judgment means judges whether output signals from the oxygen sensors 22R, 22L which are disposed in individual exhaust systems are right output signals which correspond to the air-fuel ratio. Since such control and judgment are carried out by execution of a program by the ECU 30, the apparatus and method of the present embodiment are capable of detecting a wrong assembly of the oxygen sensors 22R, 22L without a need to change hardware. In addition, the apparatus and the method of the present embodiment are capable of detecting a wrong assembly while discriminating it from a trouble of the oxygen sensors 22R, 22L or the engine body, enabling a significant decrease in a time required for trouble shooting.

(2) In the case where the judgment means makes a judgment of a wrong assembly, the indicating lamp 25 which serves as the notification means gives notice by being lit, easily enabling confirmation of a wrong assembly.

(3) The engine control parameter control means carries out a control to have cylinders in which a fuel cut operation is carried out during fuel cut concentrated in cylinders which belongs to one of the banks, as a control to control the engine control parameters so that the values of air-fuel ratio are different for groups of cylinders which correspond to different banks. The judgment means is capable of detecting presence or absence of a wrong assembly by monitoring the gas sensor for the bank in which fuel cut is carried out indicating lean. Accordingly, the apparatus and the method of the present invention is capable of detecting a wrong assembly during a normal vehicle operation without an additional cost.

Second Embodiment

Next, a second embodiment in which the present invention has been embodied will be described with reference to FIG. 5 and FIG. 6. The second embodiment is different from the first embodiment in the fact that the vehicle includes a self-diagnosis apparatus of the sensors. Redundant description for the portions that are similar to those of the first embodiment will be omitted or simplified.

The ECU 30 functions also as the self-diagnosis apparatus, and includes diagnosis means which make a diagnosis on gas sensor responsiveness. The ECU 30 making a diagnosis on gas sensor responsiveness by executing an air-fuel ratio dither control to forcibly change the air-fuel ratio to rich and lean alternately, and measuring a delay period between rich-lean inversion under the air-fuel ratio dither control and rich-lean inversion of the gas sensor. As shown in FIG. 5, the ECU 30 controls the engine control parameters so that the values thereof are different for the left and right banks 12L, 12R by carrying out an air-fuel ratio dither control sequentially in the left and right banks 12L, 12R when executing responsive diagnosis of the gas sensors. A dither cycle used when a dither control is executed is stored in the memory of the ECU 30.

When executing responsiveness diagnosis of the gas sensors, the ECU 30 detecting a wrong assembly by measuring a rich and lean output cycles of the gas sensors, and comparing them with values (ranges) which correspond to a dither cycle.

Figure 5:
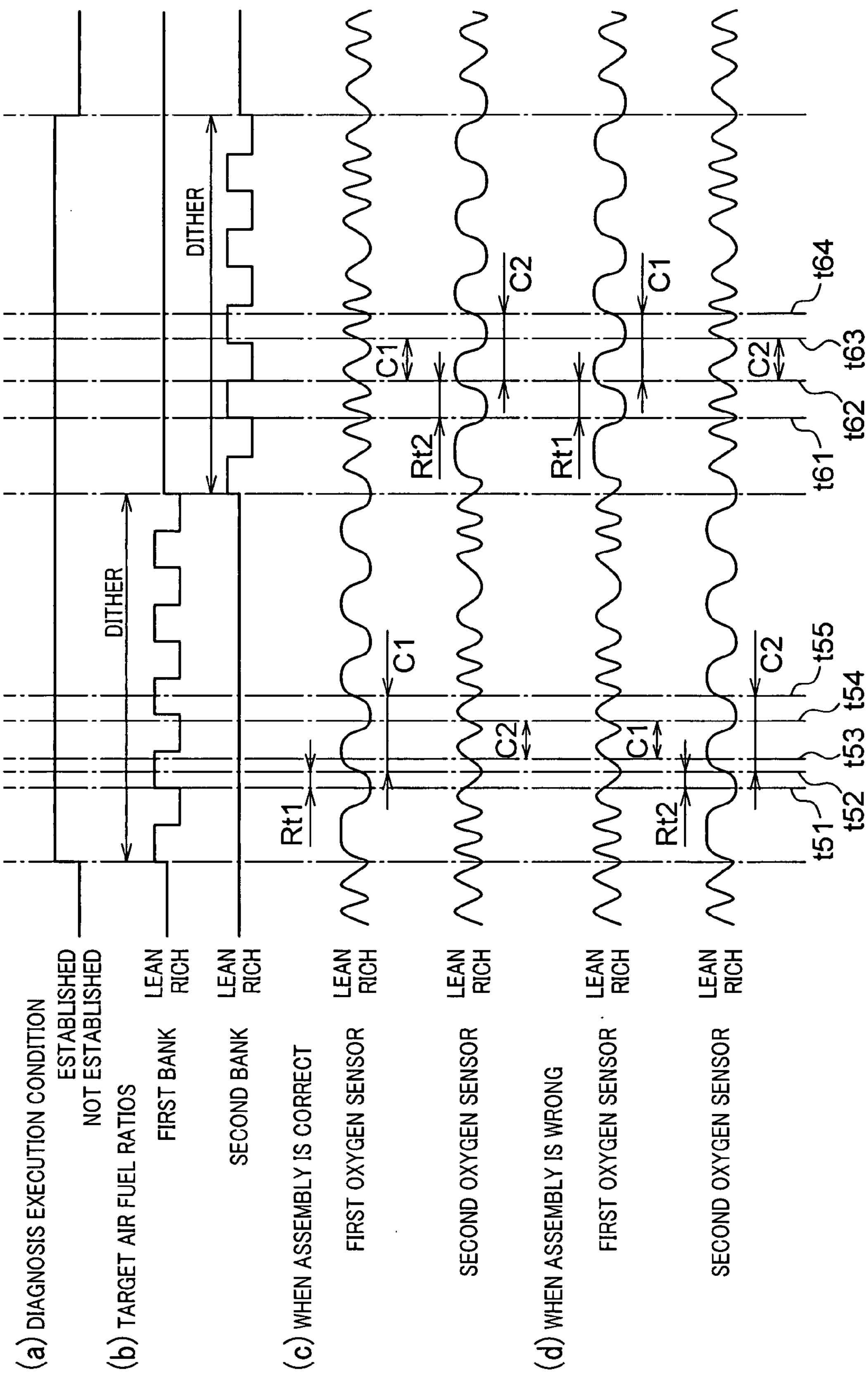
FIG. 5 is a time chart showing an output status of gas sensors (oxygen sensors) and the like in an engine in which a method for detecting an assembled state of gas sensors and an apparatus for detecting an assembled state of gas sensors according to a second embodiment of the present invention are employed.
Figure 6:
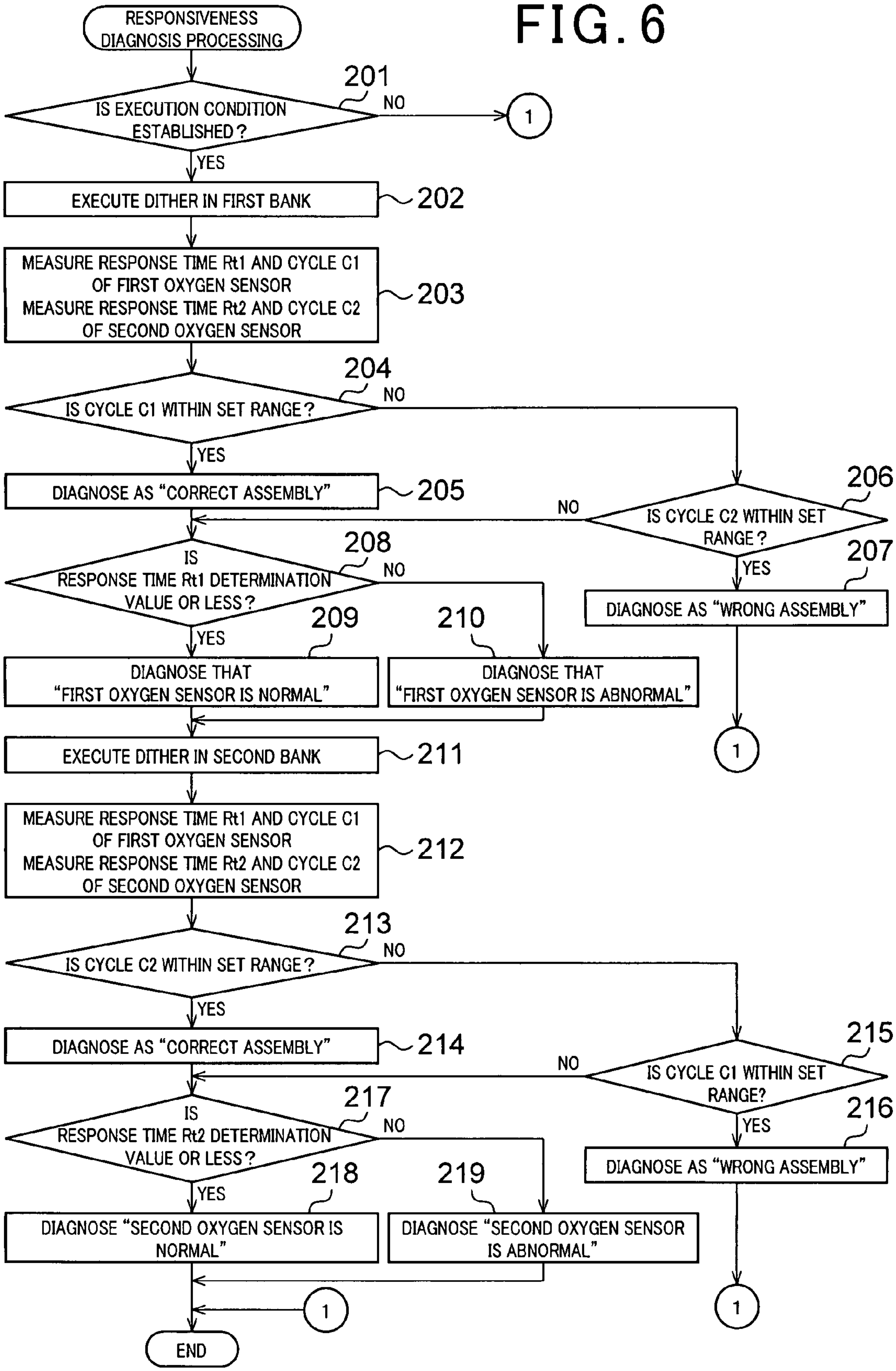
FIG. 6 is a flowchart showing a procedure for detecting a wrong assembled state of a gas sensor in the second embodiment of the present invention.

FIG. 5 is a time chart showing target air-fuel ratios for individual banks and output status from individual gas sensors in the state where the gas sensors (oxygen sensors 22R, 22L) are correctly assembled and in the state where they are wrongly assembled, when a dither control is carried out in the sequence of the first bank (right bank 12R) and second bank (left bank 12L), when a self-diagnosis of the responsiveness of the gas sensors is executed.

As shown in FIG. 5, in the exhaust system which corresponds to the bank in which a dither control is carried out, the lean-rich state of the exhaust gas changes at a cycle which corresponds to the dither cycle. However, in the exhaust system which corresponds to the bank in which a dither control is not carried out, the lean-rich state of the exhaust gas changes in a cycle which is shorter than the dither cycle. Accordingly, detection of a wrong assembly is enabled based on whether a response cycle of the gas sensors for the bank in which a dither control is carried out is within the set range which is determined by the dither cycle.

Next, the procedure for detecting a wrong assembly of the oxygen sensors will be described with reference to the flowchart shown in FIG. 6. The ECU 30 executes oxygen sensor assembly diagnosis processing by executing the processing in the flowchart shown in FIG. 6.

The ECU 30 judges at Step 201 whether the condition for executing a responsiveness diagnosis is established. If the condition is established the ECU 30 advances to Step 202, and if the condition is not established the ECU 30 terminates the processing. Examples of the condition for executing a responsiveness diagnosis include, for example, that a time period required until the oxygen sensors 22R, 22L have been activated has elapsed after the engine 11 started an operation. At Step 202, the ECU 30 executes a dither control in the first bank (right bank 12R). Next, at Step 203, the ECU 30 measures a response time Rt1 of the first oxygen sensor (oxygen sensor 22R) and a response time Rt2 of the second oxygen sensor (oxygen sensor 22L), and measures a cycle C1 of the first oxygen sensor and a cycle C2 of the second oxygen sensor (oxygen sensor 22L).

The response times Rt1, Rt2 refer to time periods from a rising time t51 of the dither cycle from rich to lean to an inflection point at which the outputs from the oxygen sensors 22R, 22L change from rich to lean, respectively. Accordingly, in the case where both oxygen sensors 22R, 22L are correctly assembled, as shown in (c), the right response time Rt1 is a time period from the time t51 to a time t52, and the right response time Rt2 is a time period from a time t61 to a time t62. In the state where a dither control is carried out for the first bank, the response time Rt2 of the second oxygen sensor is not measured in a right value, and in the state where a dither control is executed for the second bank, the response time Rt1 of the first oxygen sensor is not measured in a right value. On the other hand, in the case where both oxygen sensors 22R, 22L are wrongly assembled, as shown in (d), the right response time Rt2 is a time period from the time t51 to the time t52, and the response time Rt1 is a time period from the time t61 to the time t62.

The cycle C1 refers to a single cycle of the output from the oxygen sensor 22R, and the cycle C2 refers to a single cycle of the output from the oxygen sensor 22L. The cycles C1, C2 are measured, for example, for a time period starting from the time of the inflection point at which the outputs from the respective oxygen sensors 22R, 22L change from rich to lean and to the time of the inflection point at which the outputs change from rich to lean for the next.

Next, the ECU 30 judges at Step 204 whether the cycle C1 is within the set range, and if the cycle C1 is within the set range the ECU 30 advances to Step 205. After the ECU 30 diagnoses that the oxygen sensors 22R, 22L are correctly assembled at Step 205, the ECU 30 advances to Step 208.If the cycle C1 is not within the set range at Step 204, the ECU 30 advances to Step 206 where the ECU 30 judges whether the cycle C2 is within the set range. If the cycle C2 is within the set range, after the ECU 30 Step 207 makes a judgment of a wrong assembly, it terminates the processing. On the other hand, if the cycle C2 is not within the set range, the ECU 30 advances to Step 208.

The ECU 30 judges at Step 208 whether the response time Rt1 is a determination value or less. If the response time Rt1 is the determination value or less, the ECU 30 advances to Step 209. After the ECU 30 diagnoses that the first oxygen sensor (oxygen sensor 22R) is normal at Step 209, the ECU 30 advances to Step 211. If the response time Rt1 is greater than the determination value at Step 208, the ECU 30 advances to Step 210. After the ECU 30 judges that the first oxygen sensor (oxygen sensor 22R) is abnormal at Step 210, it advances to Step 211.

Next, at Step 211, the ECU 30 executes a dither control in the second bank (left bank 12L). Next, at Step 212, the ECU 30 measures the response time Rt1 of the first oxygen sensor (oxygen sensor 22R) and the response time Rt2 of the second oxygen sensor (oxygen sensor 22L), and measures the cycle C1 of the first oxygen sensor and the cycle C2 of the second oxygen sensor.

Next, the ECU 30 judges at Step 213 whether the cycle C2 is within a set range. If the cycle C2 is within the set range, the ECU 30 advances to Step 214. After the ECU 30 diagnoses that the oxygen sensors 22R, 22L are correctly assembled at Step 214, the ECU 30 advances to Step 217.If the cycle C2 is not within the set range at Step 213, the ECU 30 advances to Step 215 where it judges whether the cycle C1 is within the set range. If the cycle C1 is within the set range, after the ECU 30 makes a judgment of a wrong assembly at Step 216, it terminates the processing. On the other hand, if the cycle C1 is not within the set range, the ECU 30 advances to Step 217.

The ECU 30 judges at Step 217 whether the response time Rt2 is the determination value or less. If it is the determination value or less, the ECU 30 advances to Step 218. After the ECU 30 diagnoses that the second oxygen sensor (oxygen sensor 22L) is normal at Step 218, it terminates the processing. If the response time Rt2 is greater than the determination value at Step 217, the ECU 30 advances to Step 219. After the ECU 30 diagnoses that the second oxygen sensor (oxygen sensor 22L) is abnormal at Step 219, it terminates the processing.

The apparatus and the method of the present embodiment provide advantageous effects as described below in addition to the advantageous effects which are similar to the advantageous effects (1), (2) of the first embodiment.

(4) The method and the apparatus of the present invention controls the engine control parameters so that the values thereof are different for the left and right banks by carrying out an air-fuel ratio dither control sequentially in the left and right banks, when executing a responsive diagnosis of the gas sensors with the self-diagnosis apparatus. The method and the apparatus of the present invention is capable of detecting a wrong assembly by measuring the rich and lean output cycles of the gas sensors, and comparing them with values which correspond to the dither cycle. In other words, the method and the apparatus of the present invention are capable of detecting a wrong assembly as a part of the control during the diagnosis which is conventionally carried out by the self-diagnosis apparatus.

(5) Although a prolonged lean duration time might affect oxidation and reduction with a catalyst in the first embodiment, the present embodiment is free from such possibility.

Third Embodiment

Next, a third embodiment in which the present invention has been embodied will be described with reference to FIG. 7 and FIG. 8. The third embodiment is the same as the second embodiment in the fact that an air-fuel ratio dither control is applied when a responsiveness diagnosis of the gas sensors is executed to control the engine control parameters so that the values thereof are different for the left and right banks. However, the embodiment is different from the second embodiment in the fact that it is realized by having varied air-fuel ratio dither cycles for the left and right banks. Redundant description for the portions that are similar to those of the second embodiment will be omitted or simplified.

Figure 7:
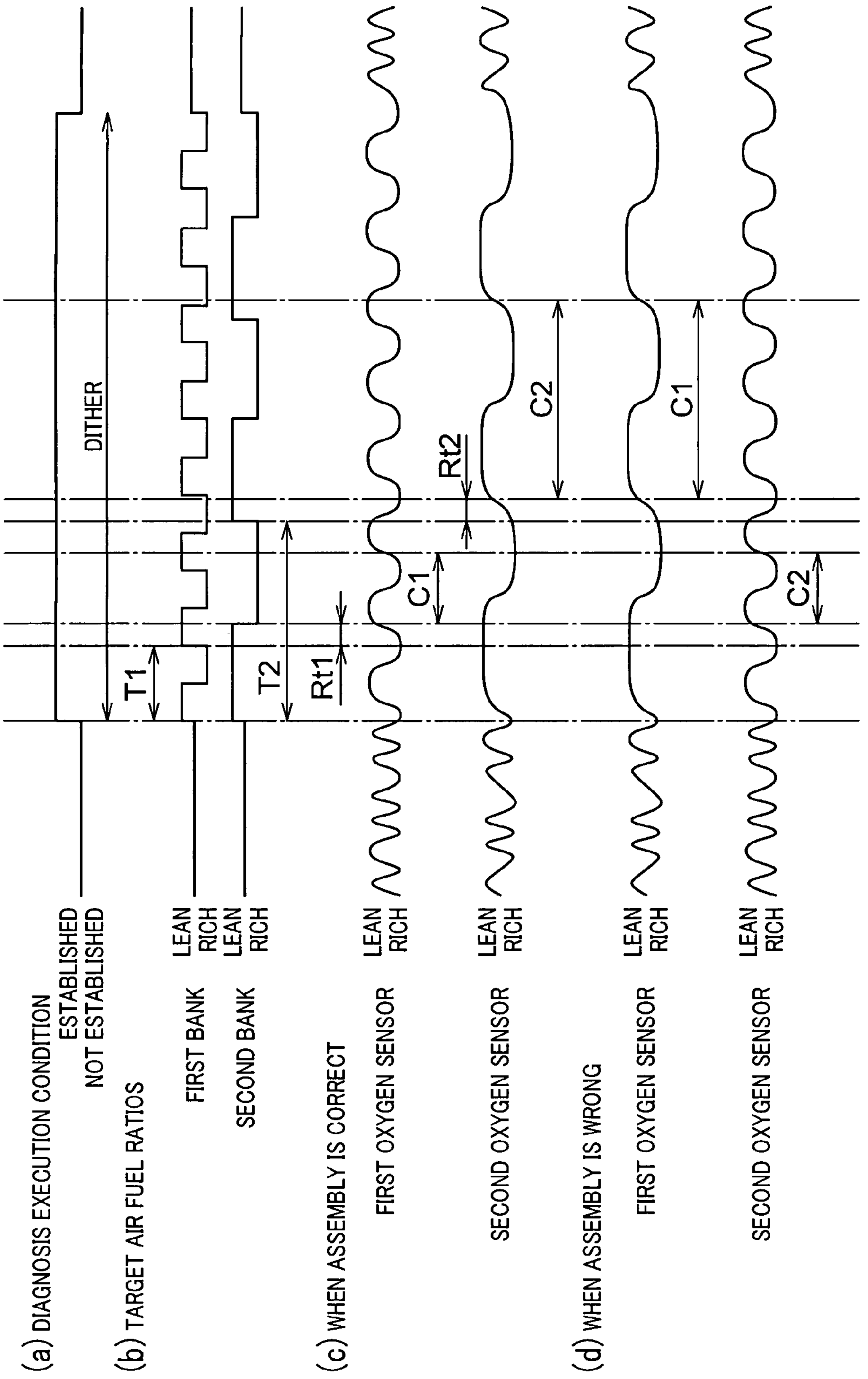
FIG. 7 is a time chart showing an output status of gas sensors (oxygen sensors) and the like in an engine in which a method for detecting an assembled state of gas sensors and an apparatus for detecting an assembled state of gas sensors according to a third embodiment of the present invention are employed.
Figure 8:
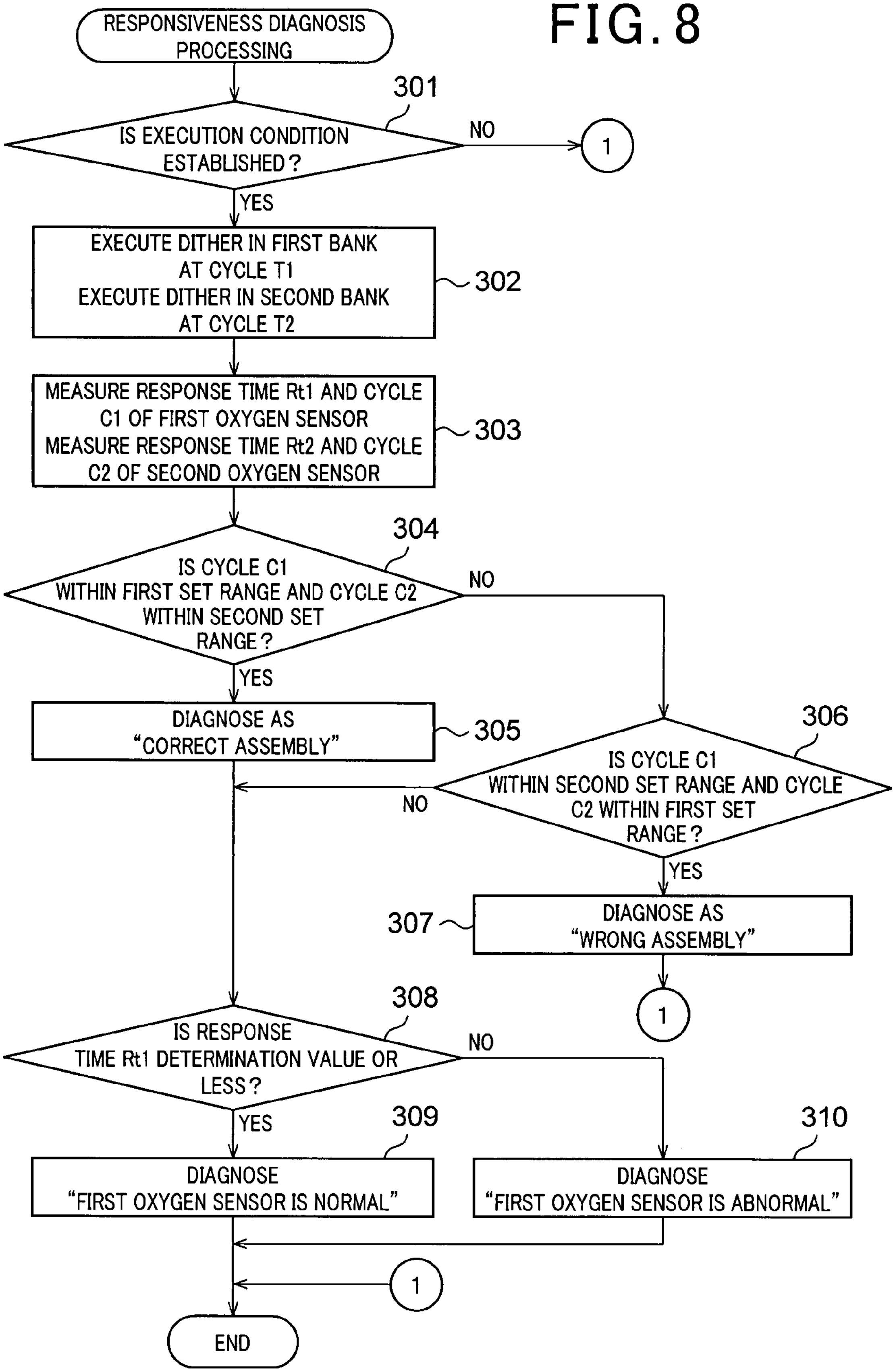
FIG. 8 is a flowchart showing a procedure for detecting a wrong assembled state of a gas sensor in the third embodiment of the present invention.

FIG. 7 is a time chart showing a target air-fuel ratio for each bank and an output status from individual gas sensors in the state where the gas sensors (oxygen sensors 22R, 22L) are correctly assembled and in the state where they are wrongly assembled, when a dither control is carried out at different dither cycles in the first bank (right bank 12R) and the second bank (left bank 12L).

As shown in FIG. 7, in the present embodiment, the apparatus carries out a control so that a dither cycle T1 for the right bank 12R is shorter than a dither cycle T2 for the left bank 12L. Accordingly, if the oxygen sensors 22R, 22L are correctly assembled, as shown in (c), the cycle C1 of the first oxygen sensor 22R corresponds to the dither cycle T1 of the right bank 12R and the cycle C2 of the second oxygen sensor 22L corresponds to the dither cycle T2 of the left bank 12L. Accordingly, the apparatus is capable of detecting a wrong assembly based on whether the cycle of the gas sensor for the bank in which a dither control is carried out is within a set range which is determined by the dither cycle.

Next, the procedure for detecting a wrong assembly of the oxygen sensors will be described with reference to the flowchart shown in FIG. 8. The ECU 30 executes oxygen sensor assembly diagnosis processing by executing the processing in the flowchart shown in FIG. 8.

The ECU 30 judges at Step 301 whether the condition for executing a responsiveness diagnosis is established. If the condition is established the ECU 30 advances to Step 302, and if the condition is not established the ECU 30 terminates the processing. At Step 302, the ECU 30 executes a dither control in the first bank (right bank 12R) at the cycle T1 and executes a dither control in the second bank (left bank 12L) at the cycle T2. Next, at Step 303, the ECU 30 measures a response times Rt1, Rt2 of the first and second oxygen sensors (oxygen sensors 22R, 22L), and measures the cycle C1 of the first oxygen sensor and the cycle C2 of the second oxygen sensor.

Next, the ECU 30 judges at Step 304 whether the cycle C1 is within the first set range and the cycle C2 is within the second set range. If YES the ECU 30 advances to Step 305 and if NO it advances to Step 306. After the ECU 30 diagnoses at Step 305 that the oxygen sensors 22R, 22L are correctly assembled, it advances to Step 308. The ECU 30 judges at Step 306 whether the cycle C1 is within the second set range and the cycle C2 is within the first set range. If YES the ECU 30 advances to Step 307, and if NO it advances to Step 308. After the ECU 30 makes a diagnosis of a wrong assembly at Step 307, it terminates the processing.

The ECU 30 judges at Step 308 whether the response time Rt1 is a determination value or less. If it is the determination value or less, the ECU 30 advances to Step 309. After the ECU 30 diagnoses that the first oxygen sensor (oxygen sensor 22R) is normal at Step 30, it terminates the processing. If the response time Rt1 is greater than the determination value at Step 308, the ECU 30 advances to Step 310 where it judges that the first oxygen sensor (oxygen sensor 22R) is abnormal. Note that, also for the response time Rt2 of the second oxygen sensor, after the ECU 30 make a diagnosis in the same manner as the first oxygen sensor, it terminates the processing, although illustration is omitted in FIG. 8.

The method and the apparatus of the present embodiment provides an advantageous effect as described below in addition to the advantageous effects which are similar to the advantageous effects (1), (2) of the first embodiment and the advantageous effects (5) of the second embodiment.

(6) The method and the apparatus of the present embodiment control the engine control parameters so that the values thereof are different for the left and right banks by carrying out an air-fuel ratio dither control in the left and right banks simultaneously and at different cycles, when executing a responsive diagnosis of the gas sensors with the self-diagnosis apparatus. The method and the apparatus of the present embodiment are capable of detecting a wrong assembly by measuring the rich and lean output cycles of the gas sensors, and comparing them with values which correspond to the dither cycle. In other words, the method and the apparatus of the present embodiment are capable of detecting a wrong assembly as a part of the control during the diagnosis which is conventionally carried out by the self-diagnosis apparatus. Furthermore, the method and the apparatus of the present embodiment enable terminating a responsiveness diagnosis of the gas sensors earlier than the apparatus of the second embodiment.

Note that, embodiments are not limited to the embodiments as described above, and they may be carried out, for example, in the modes as described below.

As a control of controlling the engine control parameters that affect the air-fuel ratio so that the values thereof are different for the groups of cylinders which correspond to different exhaust systems, the ECU 30 may carry out a control to temporarily increase or decrease an amount of fuel injected from the group of cylinders which corresponds to one of the banks. For example, the ECU 30 has stored in advance the values of rich and lean outputs from the gas sensors (oxygen sensors 22R, 22L) which correspond to the amount of increase and decrease of the fuel in the memory, and the ECU 30 detects a wrong assembly by comparing the amount of increase and decrease of fuel with the rich and lean outputs of the gas sensors.

As a control of controlling the engine control parameters so that the values thereof are different for the groups of cylinders which correspond to different banks, the ECU 30 may carry out a control to temporarily increase an amount of fuel injected from the group of cylinders which corresponds to one of the banks and decrease an amount of fuel injected from the group of cylinders which correspond to the other bank. Also in this case, the ECU 30 has stored in advance the values of rich and lean outputs from the gas sensors (oxygen sensors 22R, 22L) which correspond to the amount of increase and decrease of the fuel in the memory, and the ECU 30 detects a wrong assembly by comparing the amount of increase and decrease of fuel with the rich and lean outputs of the gas sensors.

As a control of the engine control parameters that affect the air-fuel ratio, the method and the apparatus may not only control an injection amount of fuel, but also may change an amount of intake air. Alternatively, the apparatus may change an amount of intake air without changing an amount of fuel injection.

In a case where a configuration in which an air-fuel ratio dither control is carried out sequentially in the left and right banks is employed as a control by the ECU 30 of controlling the engine control parameters so that the values thereof are different for the left and right banks as is the case for the second embodiment, the method and the apparatus may carry out only detection of a wrong assembly, instead of making a diagnosis of abnormality of the gas sensor responsiveness and detection of a wrong assembly simultaneously. Specifically, in the flowchart in FIG. 6, at Steps 203, 212, measurement of the response times Rt1, Rt2 of the gas sensors (oxygen sensors 22R, 22L) may be omitted, and Steps 208 to 210 and Steps 217 to 219 may be omitted. In this case, the method and the apparatus enable detection of a wrong assembly of the gas sensors.

In the case where a configuration in which an air-fuel ratio dither control is carried out in the left and right banks simultaneously and at different cycles as a control by the ECU 30 for controlling the engine control parameters so that the values thereof are different for the left and right banks as is the case for the third embodiment, the apparatus may carry out only detection of a wrong assembly, instead of simultaneously making a diagnosis of abnormality of the gas sensor responsiveness and detection of a wrong assembly. Specifically, in the flowchart in FIG. 8, at Step 303, measurement of the response times Rt1, Rt2 of the gas sensors (oxygen sensors 22R, 22L) may be omitted, and Steps 308 to 310 may be omitted. In this case, the method and the apparatus enable detection of a wrong assembly of the gas sensors.

As the engine 11, the method and the apparatus may be applied to an engine with a configuration other than one which includes a pair of right and left banks 12R, 12L and which includes a gas sensor for detecting an oxygen concentration in exhaust gas in each of the exhaust passages 19R, 19L may be applied. For example, the method and the apparatus may be applied to an engine with a configuration including three or more banks, or an engine with a configuration which includes one bank, a plurality of cylinders which are arranged which are arranged in series being divided into two groups, and an exhaust system in each of the groups.

The engine 11 is not limited to a gasoline engine or a diesel engine. The method and the apparatus may be applied to any engine which burns fuel and emits exhaust gas.

The configuration of the indicating lamp 25 which serves as the notification means is not limited to a configuration in which the indication lamp 25 is lit when the apparatus detects a wrong assembly. Instead the indication lamp 25 may have a configuration in which it is lit in the right assembled state. Alternatively, both an indication lamp which is lit when the apparatus detects a wrong assembly and an indication lamp which is lit in the right assembled state may be provided.

Other Embodiments

The engine may include two, that is, left and right banks and may be provided with an exhaust system which corresponds to each bank. The engine in this case is a V engine or a horizontally-opposed engine. When the engine control parameter control means carries out a control to have cylinders in which a fuel cut operation is carried out during fuel cut concentrated to cylinders which belong to one of the banks, the judgment means monitors that the gas sensors for the bank in which fuel cut is executed provide outputs indicating a lean state and thereby detects presence/absence of a wrong assembly. In this case, the method and the apparatus enable detecting a wrong assembly without an additional cost.

The engine may include two, that is, left and right banks and may be provided with an exhaust system which corresponds to each bank. The engine in this case is a V engine or a horizontally-opposed engine. The engine control parameter control means may control the engine control parameters so that the values thereof are different for the groups of cylinders which correspond to different banks by carrying out a control to temporarily increase or decrease an amount of fuel injected from the group of cylinders which corresponds to one of the banks. In this case, the method and the apparatus enable detecting a wrong assembly by comparing the amount of increase and decrease of fuel with rich and lean outputs of the gas sensors.

The engine may include two, that is, left and right banks and may be provided with an exhaust system which corresponds to each bank. The engine in this case is a V engine or a horizontally-opposed engine. The engine control parameter control means may control the engine control parameters so that the values thereof are different for the groups of cylinders which correspond to different banks by temporarily increasing an amount of fuel injected from the group of cylinders which corresponds to one of the banks and decreasing an amount of fuel injected from the group of cylinders which corresponds to the other bank. In this case, the method and the apparatus enable detecting a wrong assembly by comparing the amount of increase and decrease of fuel with rich and lean outputs of the gas sensors.

The engine may include two, that is, left and right banks and may be provided with an exhaust system which corresponds to each bank. The engine in this case is a V engine or a horizontally-opposed engine. In addition, the engine is mounted in a vehicle including a self-diagnosis apparatus, and the self-diagnosis apparatus includes diagnosis means which makes a diagnosis on gas sensor responsiveness. The method and the apparatus may control the engine control parameters so that the values thereof are different for the left and right banks by carrying out an air-fuel ratio dither control sequentially in the left and right banks when the self-diagnosis apparatus executes a responsiveness diagnosis of the gas sensors. In this case, the method and the apparatus enable detecting a wrong assembly by measuring the rich and lean output cycles of the gas sensors, and comparing them with values which correspond to the dither cycle. The air-fuel ratio dither control may be executed as a part of the control during the diagnosis which is conventionally carried out by the self-diagnosis apparatus which makes a diagnosis on gas sensor responsiveness.

The engine may include two, that is, left and right banks and may be provided with an exhaust system which corresponds to each bank. The engine in this case is a V engine or a horizontally-opposed engine. In addition, the engine is mounted in a vehicle including a self-diagnosis apparatus, and the self-diagnosis apparatus includes diagnosis means which makes a diagnosis on gas sensor responsiveness. The method and the apparatus may control the engine control parameters so that the values thereof are different for the left and right banks by carrying out an air-fuel ratio dither control in the left and right banks simultaneously and at different cycles when the self-diagnosis apparatus executes a responsiveness diagnosis of the gas sensors. In this case, the method and the apparatus enable detecting a wrong assembly by measuring the rich and lean output cycles of the gas sensors, and comparing them with values which correspond to the dither cycle. Furthermore, the method and the apparatus enable terminating a responsiveness diagnosis of the gas sensors earlier than the case described above.

So far, the embodiments have been described as a method or an apparatus for detecting a wrong detection of the gas sensors. Alternatively, the present invention may be construed focusing on how to determine assembled states of a plurality of sensors as a method for detecting an assembled state of gas sensors.

Specifically, the method and the apparatus are capable of determining whether the assembly is correct or wrong by controlling the engine control parameters that affect the air-fuel ratio so that the values thereof are different for the groups of cylinders corresponding to different exhaust systems compared to the other exhaust systems in the state where the engine is actually operating, monitoring the outputs from the gas sensors in this state, and judging whether the outputs from the gas sensors are expected outputs corresponding to the values of the engine control parameters. Note that, in the present invention, determining whether the assembly is correct or wrong does not mean determining whether the assembled state is good or not, but means determining whether the gas sensors attached in respective banks of the engine, that is, the left and right exhaust systems are connected to two sensor inputs of the engine control apparatus, respectively, with a correct left and right physical correspondence.

In addition, as a method for making the control parameters that affect the air-fuel ratio different, a method which carries out so called fuel cut may also be used. When the accelerator opening which controls the engine output is decreasing or when the accelerator is in a closed state, the fuel cut may be realized by carried out fuel cut in all cylinders in one of the banks, (which is judged based on the output such as from an accelerator opening sensor) in the case, for example, where the engine is separated into the left and right banks and thus has different exhaust systems. At this time, it is only necessary that the numbers of cylinders in which fuel cut is carried out are different for the exhaust systems in the left and right banks. However, it is preferable that fuel cut be not carried out in the other bank to enhance reliability.

Alternatively, as a method for making the control parameters that affect the air-fuel ratio different, a method is conceivable for carrying out an air-fuel ratio dither control for one and not carrying out a dither control for the other. The method enables determining whether the assembly is right or wrong by determining whether the values outputted from the sensors by the dither control correspond to the dither control cycles. In addition, the method is preferable since it is capable of judging not only the assembled state but also whether the sensor itself is normal or abnormal since the method acquires a plurality of pieces of information on the sensor characteristics when it makes a diagnosis on the assembled state.

What is claimed is:

1. An apparatus for detecting an assembled state of gas sensors in a vehicle, wherein said vehicle is equipped with an engine including a plurality of exhaust systems, a plurality of groups of cylinders which are installed so as to correspond to said plurality of exhaust systems, and a gas sensor which is assembled in each of said plurality of exhaust systems and which detects an oxygen concentration in an exhaust gas for an air-fuel ratio feedback control of said engine based on a signal detected by said gas sensor, the apparatus for detecting an assembled state of said gas sensor comprising:

means for controlling a value of an engine control parameter which affects the air-fuel ratio of said engine, so that the values are different from each other for said plurality of groups of cylinders which correspond to said plurality of exhaust systems;

means for judging whether an output from said gas sensor which is installed in each of said plurality of exhaust systems is a normal output which corresponds to the value of said engine control parameter; and means for giving notice of a result of the judgment made by said means for judging.

2. The apparatus for detecting an assembled state of gas sensors according to claim 1, wherein said engine includes first and second banks, said plurality of exhaust systems have first and second exhaust systems which correspond to said first and second banks, respectively, said plurality of groups of cylinders have first and second groups of cylinders which correspond to said first and second banks, respectively, and said means for controlling is configured to control the value of the engine control parameter, so that the values are different from each other for said first and second groups of cylinders which correspond to said first and second banks, respectively.

3. The apparatus for detecting an assembled state of gas sensors according to claim 2, wherein said means for controlling is configured to have cylinders in which a fuel cut operation is carried out during fuel cut of said engine concentrated in one of said first and second groups of cylinders which belongs to one of said first and second banks.

4. The apparatus for detecting an assembled state of gas sensors according to claim 2, wherein said means for controlling is configured to temporarily increase or decrease an amount of fuel injected from one of said first and second groups of cylinders which corresponds to one of first and second banks.

5. The apparatus for detecting an assembled state of gas sensors according to claim 2, wherein said means for controlling is configured to temporarily increase an amount of fuel injected from one of said first and second groups of cylinders which corresponds to one of said first and second banks, and to decrease an amount of fuel injected from the other of said first and second groups of cylinders.

6. The apparatus for detecting an assembled state of gas sensors according to claim 1, wherein said vehicle further includes a self-diagnosis apparatus having means for diagnosing configured to diagnosis responsiveness of said gas sensor, said engine includes first and second banks, said plurality of exhaust systems have first and second exhaust systems which correspond to said first and second banks, respectively, said plurality of groups of cylinders have first and second groups of cylinders which correspond to said first and second banks, respectively, and said means for controlling is configured to control the value of the engine control parameter, so that values are different from each other for said first and second groups of cylinders which correspond to said first and second banks, respectively.

7. The apparatus for detecting an assembled state of gas sensors according to claim 6, wherein said means for controlling is configured to carry out an air-fuel ratio dither control in said first and second banks sequentially when responsiveness diagnosis of said gas sensor is executed by said self-diagnosis apparatus.

8. The apparatus for detecting an assembled state of gas sensors according to claim 6, wherein said means for controlling means is configured to carry out an air-fuel ratio dither control in said first and second banks simultaneously and at cycles which are different from each other when responsiveness diagnosis of said gas sensor is executed by said self-diagnosis apparatus.

9. The apparatus for detecting an assembled state of gas sensors according to claim 6, wherein said self-diagnosis apparatus is mounted to an ECU.

10. The apparatus for detecting an assembled state of gas sensors according to claim 1, wherein said means for controlling and said means for judging are mounted to an ECU.

11. The apparatus for detecting an assembled state of gas sensors according to claim 1, wherein said means for giving notice is configured to comprise an indicating lamp.

12. An engine comprising the apparatus for detecting an assembled state of gas sensors according to claim 1.

13. A method for detecting an assembled state of gas sensors in a vehicle, wherein said vehicle is equipped with an engine including a plurality of exhaust systems, a plurality of groups of cylinders which are installed so as to correspond to said plurality of exhaust systems, and a gas sensor which is assembled in each of said plurality of exhaust systems and which detects an oxygen concentration in an exhaust gas for an air-fuel ratio feedback control of said engine based on a signal detected by said gas sensor, the method for detecting an assembled state of said gas sensor comprising:

controlling a value of an engine control parameter which affects the air-fuel ratio of said engine, so that the values are different from each other for said plurality of groups of cylinders which correspond to said plurality of exhaust systems;

monitoring an output from said gas sensor under the controlled state, the gas sensor being installed in each of said plurality of exhaust systems; and determining that said gas sensor is in a wrong assembled state when the output from said gas sensor is not a normal output which corresponds to the value of said engine control parameter.

14. A method for detecting an assembled state of gas sensors in a vehicle, wherein said vehicle is equipped with an engine including a plurality of exhaust systems, a plurality of groups of cylinders which are installed so as to correspond to said plurality of exhaust systems, and a gas sensor which is assembled in each of said plurality of exhaust systems and which detects an oxygen concentration in an exhaust gas for an air-fuel ratio feedback control of said engine based on a signal detected by said gas sensor, the method for detecting an assembled state of said gas sensor comprising:

controlling a value of an engine control parameter which affect the air-fuel ratio of said engine, so that the values are different from each other for said plurality of groups of cylinders which correspond to said plurality of exhaust systems;

monitoring an output from said gas sensor under the controlled state, the gas sensor being disposed in each of said plurality of exhaust systems;

determining whether the output from said gas sensor is an expected output which corresponds to the value of said engine control parameter; and judging the assembled state of said gas sensor based on a result of determination.

15. The method for detecting an assembled state of gas sensors according to claim 14, wherein the step of controlling the value of said engine control parameter is a step which is realized by a fuel cut which is carried out when an accelerator opening for controlling an output of said engine is decreasing or when the accelerator is in a closed state and which stops injection of fuel from all cylinders of said group of cylinders which corresponds to said exhaust system in which said fuel cut is executed, and the step of judging the assembled state of said gas sensor is a step which is executed based on a lean output status from each gas sensor.

16. The method for detecting an assembled state of gas sensors according to claim 14, wherein the step of controlling the value of said engine control parameter is a step which carries out an air-fuel ratio dither control in one of said plurality of exhaust systems during an assembled state determination period of said gas sensor, and which does not carry out a dither control in the other exhaust system, and the step of judging the assembled state of said gas sensor is a step which is executed by judging a relation between an output from said gas sensor in said one of the exhaust systems and an expected predetermined value.

17. The method for detecting an assembled state of gas sensors according to claim 16, wherein a step of monitoring the output from said gas sensor is a step of detecting a plurality of types of outputs which include an output used for diagnosing the assembled state of said gas sensor and an output used for determining whether said gas sensor itself functions normally.

18. A method for detecting an assembled state of gas sensors in a vehicle, wherein said vehicle is equipped with an engine including a plurality of exhaust systems, a plurality of groups of cylinders which are installed so as to correspond to said plurality of exhaust systems, and a gas sensor which is assembled in each of said plurality of exhaust systems and which detects an oxygen concentration in an exhaust gas for an air-fuel ratio feedback control of said engine based on a signal detected by said gas sensor, the method for detecting an assembled state of said gas sensor comprising:

setting a predetermined value of an engine control parameter which affects the air-fuel ratio of said engine, so that the values are different from each other for said plurality of groups of cylinders which correspond to said plurality of exhaust systems;

monitoring an output from said gas sensor under the controlled state, the gas sensor being installed in each of said plurality of exhaust systems; and determining whether said gas sensor is in a wrong assembled state based on the output from said gas sensor being a normal output which corresponds to the predetermined value of said engine control parameter or an abnormal output which does not correspond to the predetermined value of said engine control parameter.

* * * * *